Dec. 17, 1968      T. R. NISBET      3,416,242

TEACHING MACHINE AND CONTROL SYSTEM

Filed March 31, 1965      8 Sheets-Sheet 1

INVENTOR.
Thomas R. Nisbet
BY
Flehr and Swain
ATTORNEYS

Dec. 17, 1968   T. R. NISBET   3,416,242
TEACHING MACHINE AND CONTROL SYSTEM
Filed March 31, 1965   8 Sheets-Sheet 3

INVENTOR.
Thomas R. Nisbet
BY
*Flehr and Swain*
ATTORNEYS

INVENTOR.
Thomas R. Nisbet
ATTORNEYS

Dec. 17, 1968  T. R. NISBET  3,416,242
TEACHING MACHINE AND CONTROL SYSTEM
Filed March 31, 1965  8 Sheets-Sheet 5

INVENTOR.
Thomas R. Nisbet
BY
Flehr and Swain
ATTORNEYS

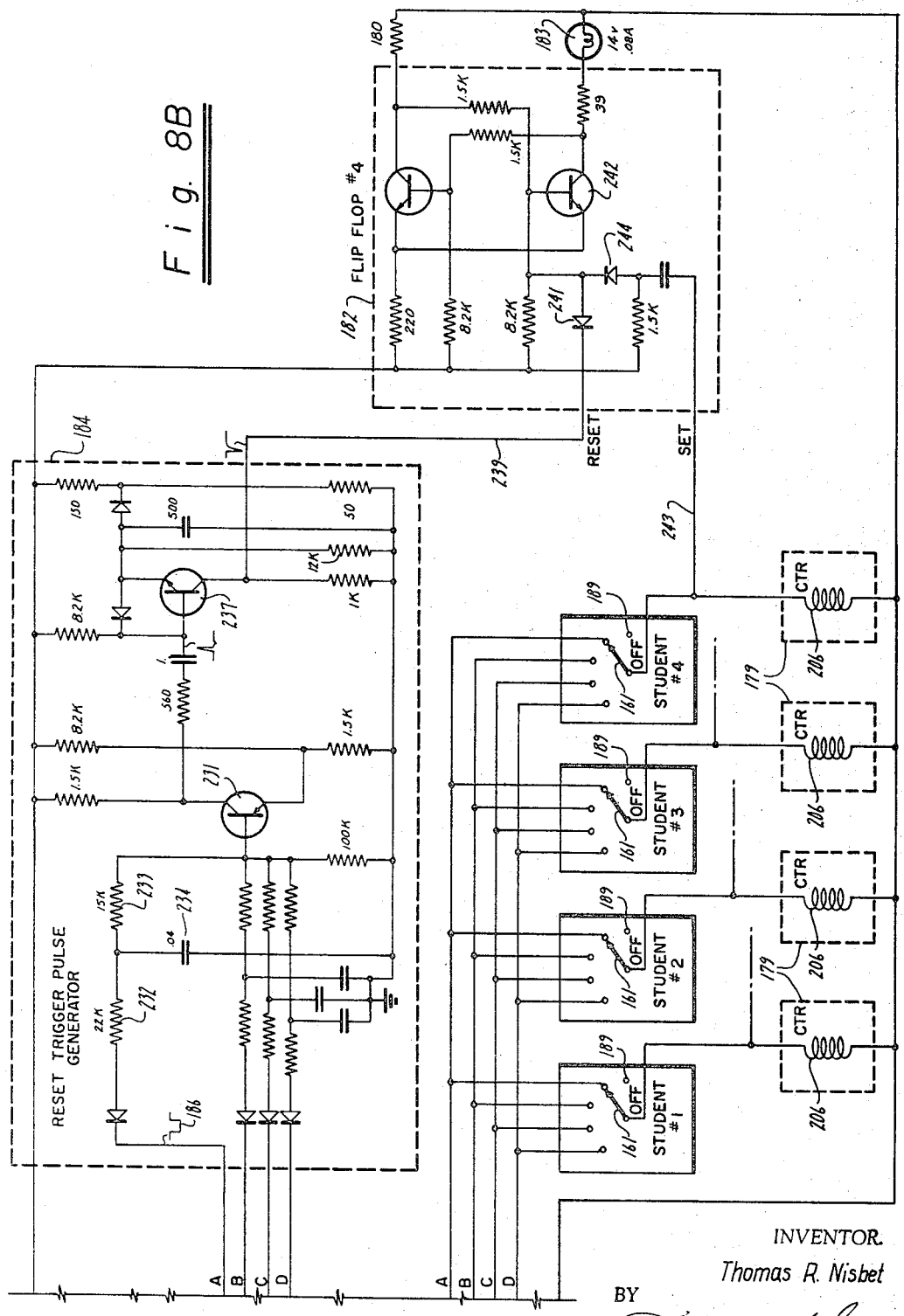

Dec. 17, 1968  T. R. NISBET  3,416,242
TEACHING MACHINE AND CONTROL SYSTEM
Filed March 31, 1965  8 Sheets-Sheet 8

INVENTOR.
Thomas R. Nisbet
BY
ATTORNEYS

United States Patent Office 3,416,242
Patented Dec. 17, 1968

3,416,242
TEACHING MACHINE AND CONTROL SYSTEM
Thomas R. Nisbet, Palo Alto, Calif., assignor, by mesne assignments, to Edex Corporation, Mountain View, Calif., a corporation of Delaware
Continuation-in-part of application Ser. No. 143,867, Oct. 9, 1961. This application Mar. 31, 1965, Ser. No. 444,298
12 Claims. (Cl. 35—48)

ABSTRACT OF THE DISCLOSURE

A teaching machine and control system which includes means for reproducing pre-recorded audio instructional material, projection means for visually displaying desired information and student entry devices for answering questions. The system also includes a control system which is responsive to control pulses developed in time relationship with respect to the audio instructional material to control the delivery of the audio and visual material and the asking and weighting of questions.

---

This application is a continuation-in-part of my copending application Serial No. 143,867, filed Oct. 9, 1961, now abandoned.

This invention relates generally to a teaching machine and more particularly to control systems particularly useful for same in conducting a class.

In general, machines for delivering audio and visual instructional material employ recorded audio material which is synchronized with a film or slide projector. Some machines include means for testing students to determine if the material is being understood.

Generally, machines of this type are relatively complex and, therefore, expensive. Machines which are simple do not perform the many functions necessary to automatically deliver a lecture and to test the students to determine the effectiveness of the lecture.

It is a general object of the present invention to provide an improved teaching machine and a control system therefor.

It is another object of the present invention to provide a teaching machine which is simple and relatively inexpensive to manufacture.

It is a further object of the present invention to provide a teaching machine which automatically delivers audio-visual lecture material and tests the students upon completion of delivery of predetermined portions of said material.

It is a further object of the present invention to provide a machine in which the students are tested by asking questions. The answers are weighted in terms of importance of the question. The total score of each student is stored.

As disclosed herein, a machine for teaching includes means for reproducing pre-recorded audio instructional material, means for projecting a visual display, and students' desks for answering questions. A control system is responsive to control pulses developed in time relationship with respect to the audio instructional material to control the delivery of the audio and visual material and the asking and weighting of questions.

Another object of the invention is to provide means for advising the instructor or students immediately of that proportion of the total number of participating students who selected each of the several possible responses.

A still further object of the invention is to provide means for advising an instructor directly that a predetermined portion of the class has made response to a question whereby, after such time, correct responses can be indicated.

An additional object of the invention is to provide means for selectively reducing the number of those student stations participating, in conjunction with means for providing a direct read-out of the proportion of participating students responding with the various possible responses.

Yet another object of the invention is to provide an indication of class performance on each question.

These and other objects of the invention will become more clearly apparent from the following description taken in conjunction with the accompanying drawing.

Figure 1:
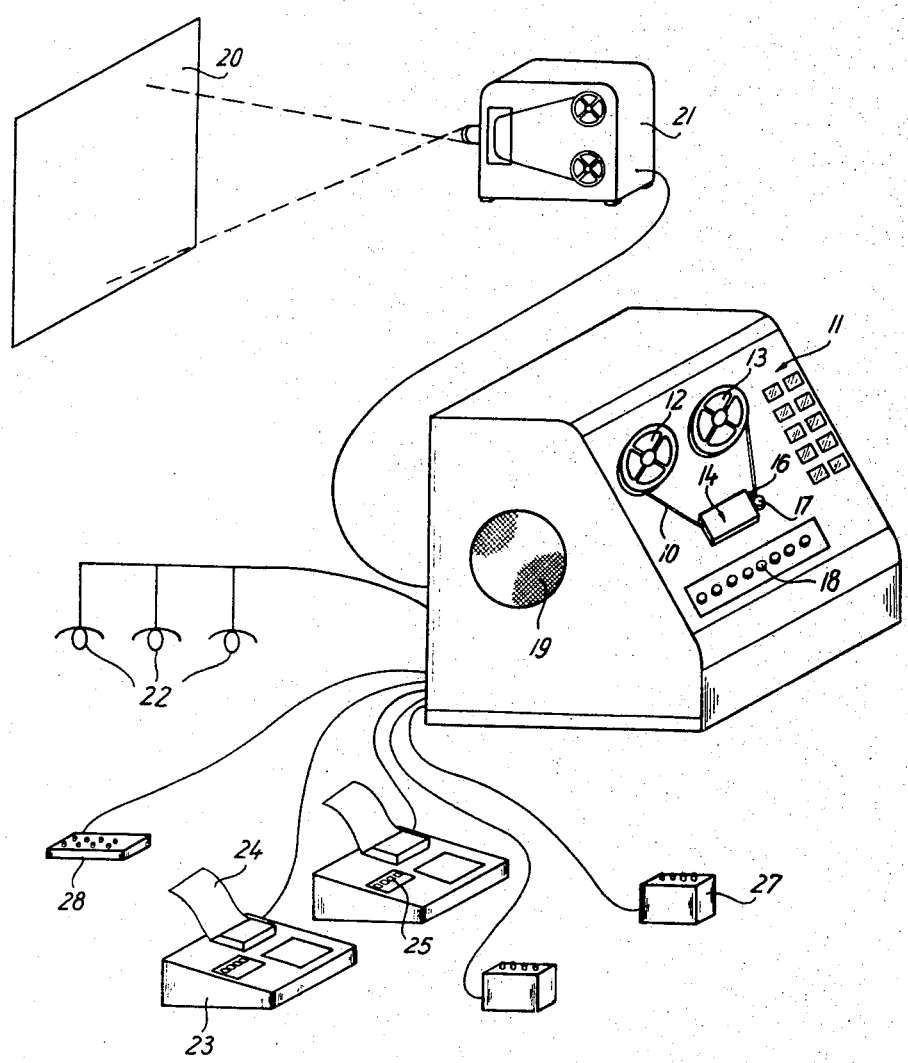
Figure 2:
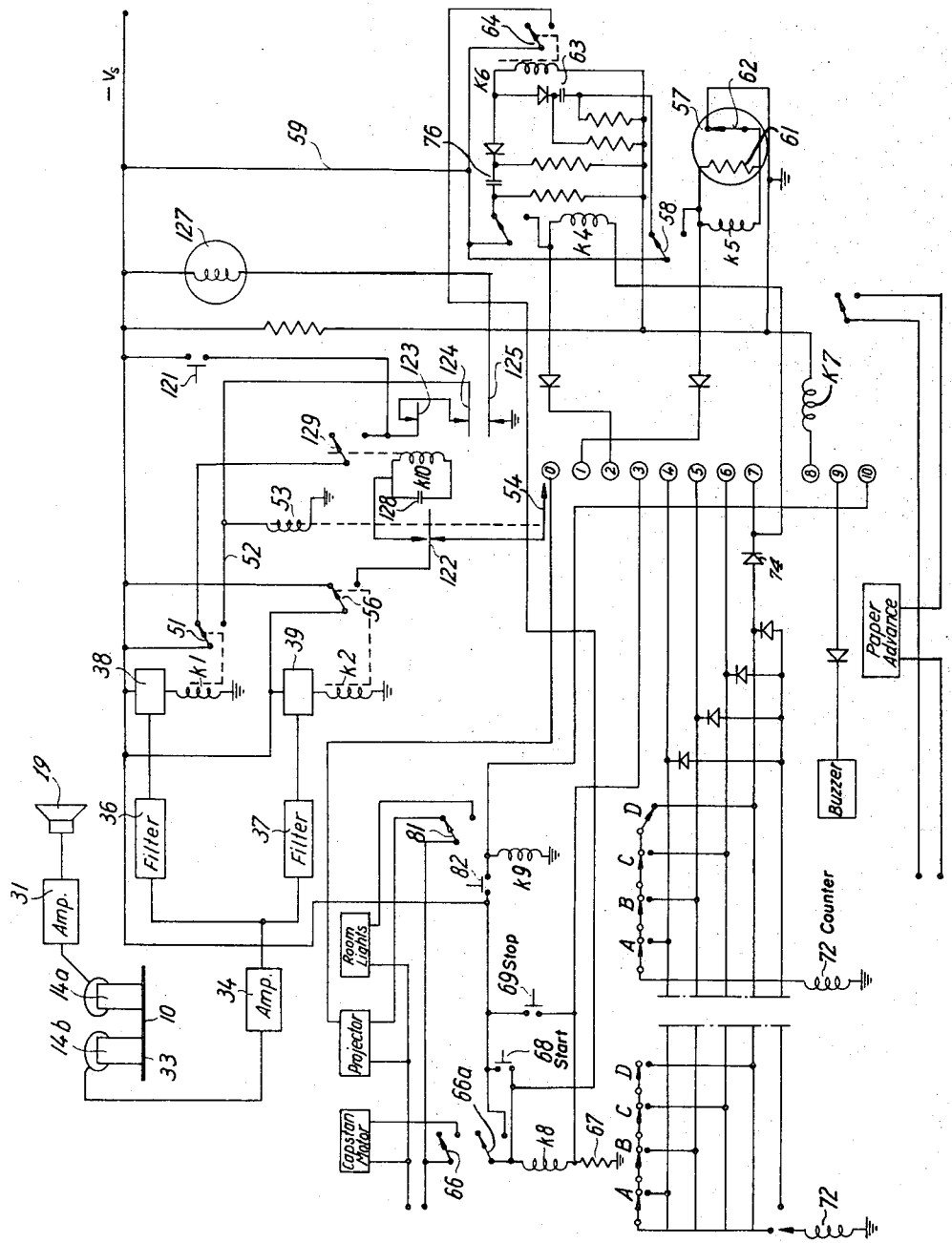
Figure 3:
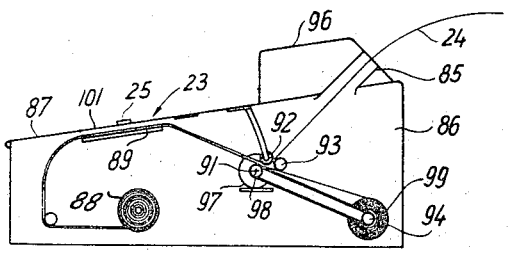
Figure 4:
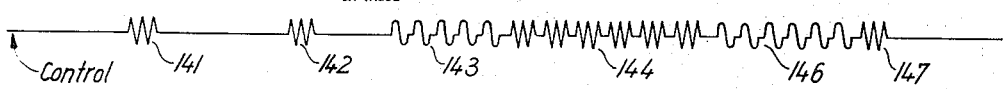
Figure 5:
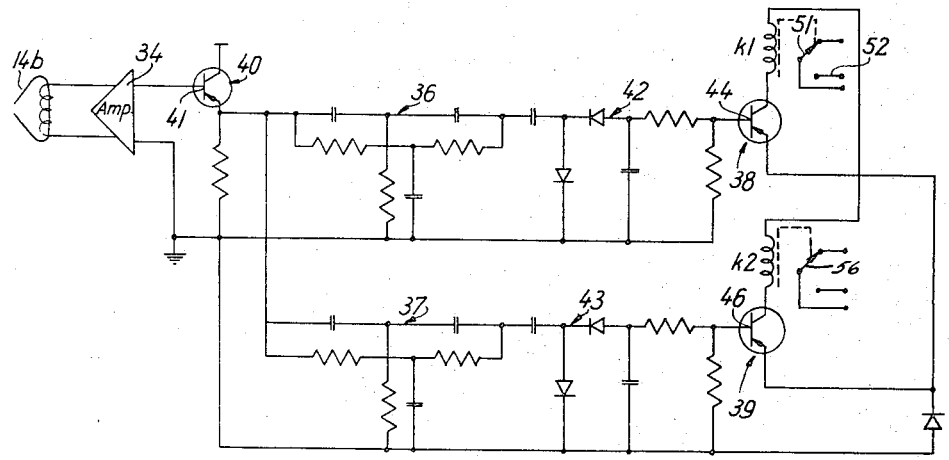
Figure 6:
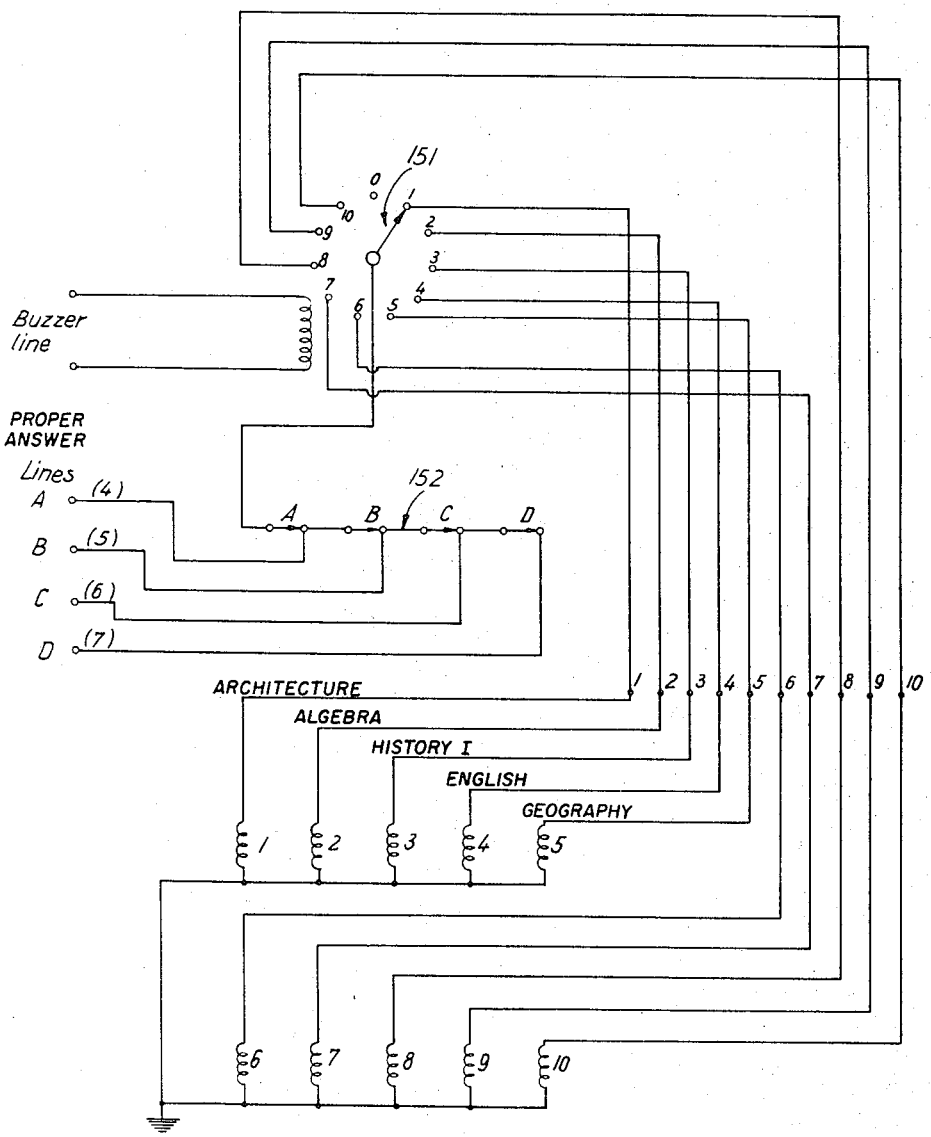
Figure 7:
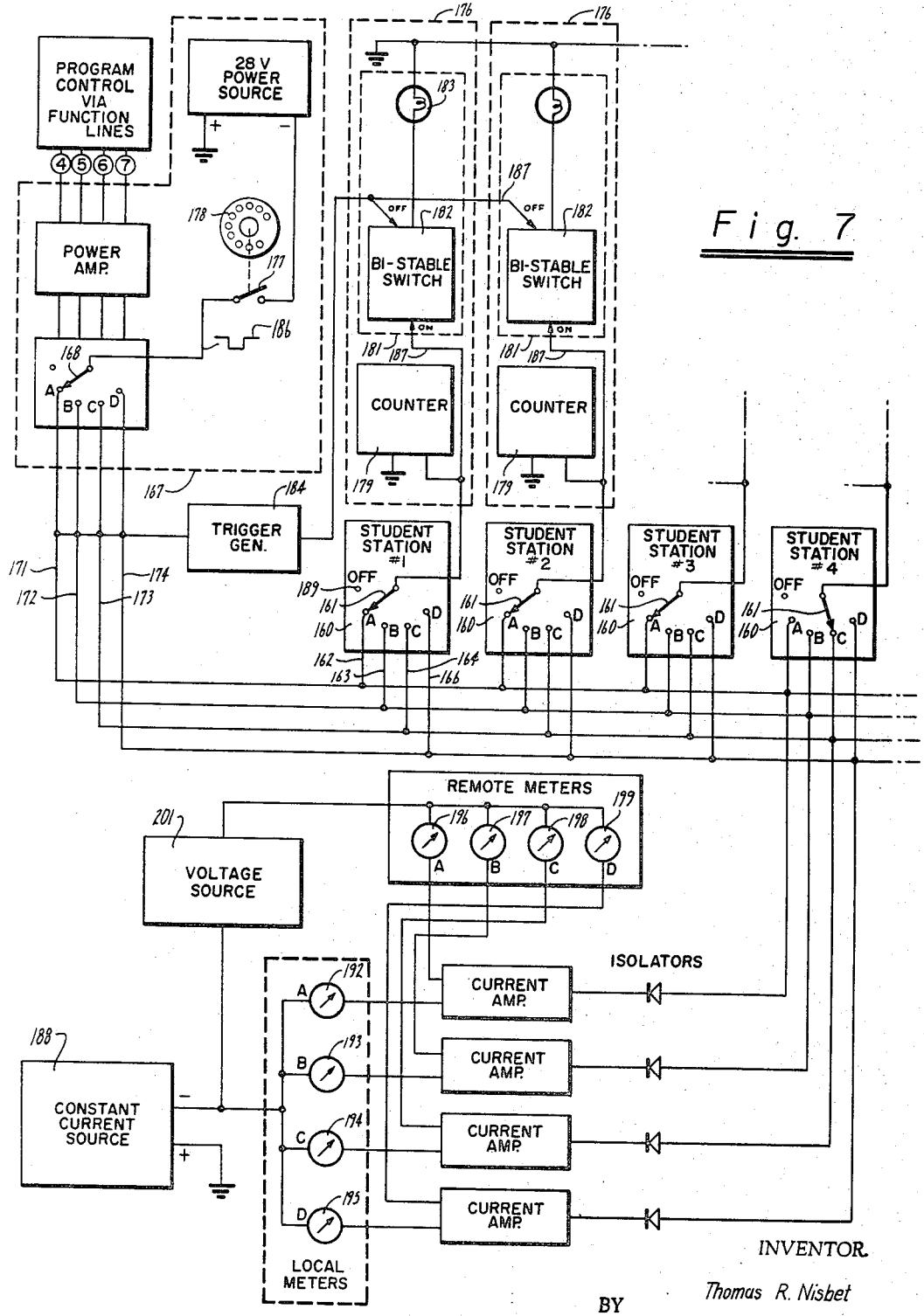
Figure 8A:
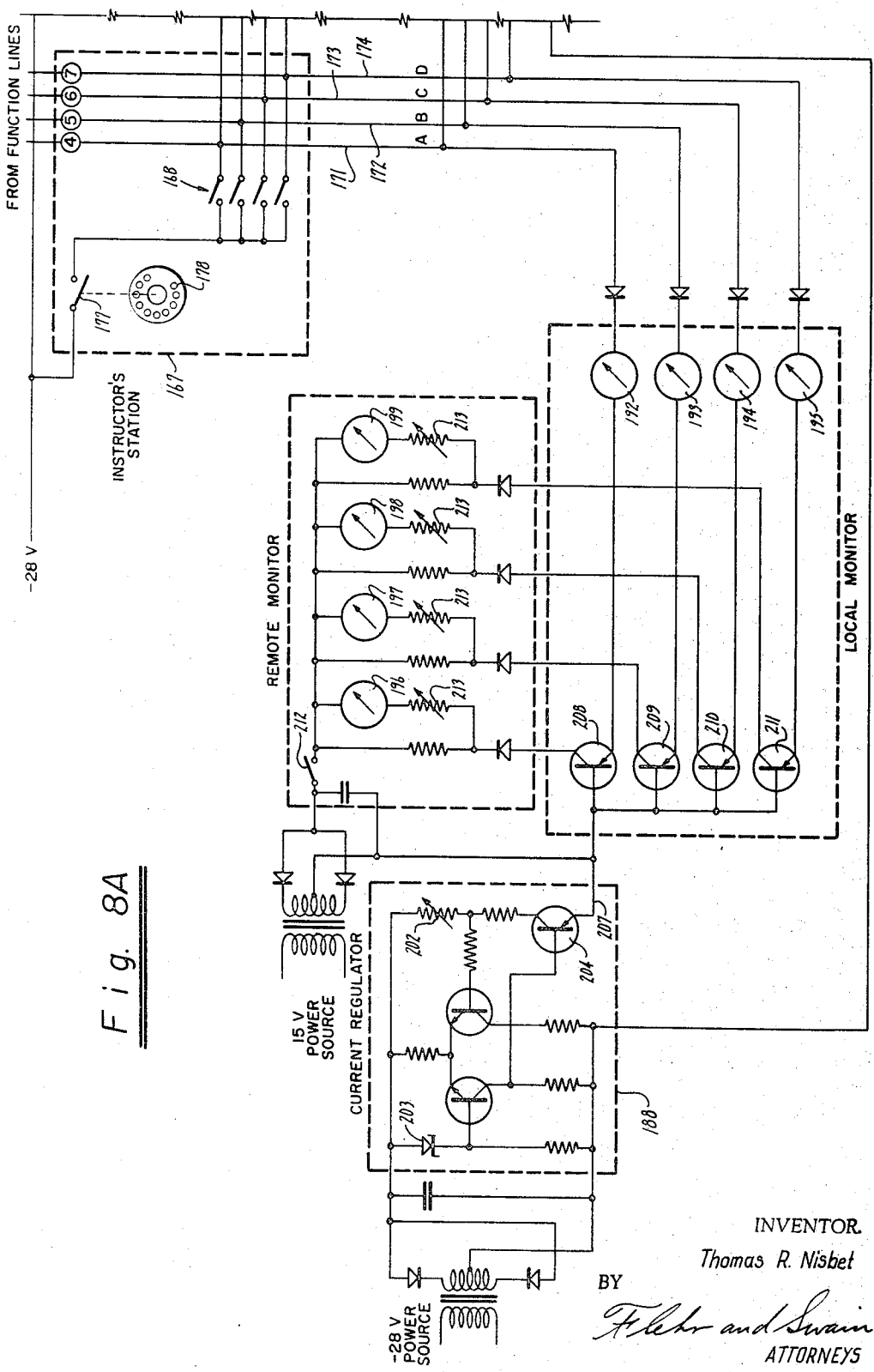
Figures 9, 10:
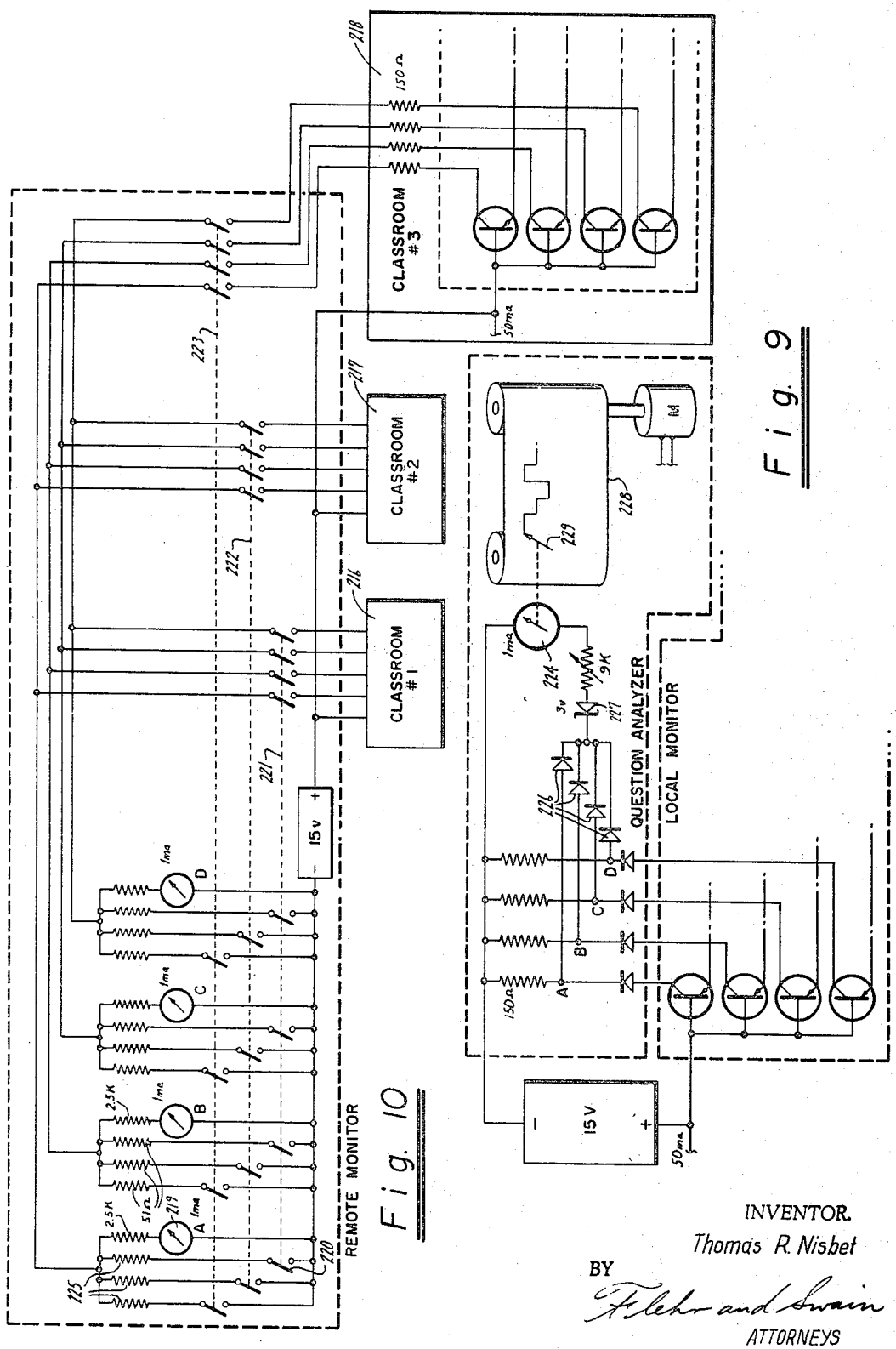

Referring to the drawing:
FIGURE 1 schematically shows a teaching machine;
FIGURE 2 is an electrical circuit diagram of the control system for a machine of the type shown in FIGURE 1;
FIGURE 3 shows a student's desk;
FIGURE 4 shows the visual presentation and control pulses for a sample lecture to illustrate the operation of the machines;
FIGURES 4A–4D show the information presented in a visual sequence.
FIGURE 5 is a circuit diagram of a frequency selective switching system:
FIGURE 6 shows an additional circuit for scoring, for a given student, different branches of a subject;
FIGURE 7 is a schematic system diagram showing another embodiment of the invention;
FIGURES 8A and 8B when combined provide a circuit diagram according to the system shown in FIGURE 7;
FIGURE 9 is a wiring schematic showing another embodiment according to the invention; and
FIGURE 10 is a schematic representation of another embodiment according to the invention.

Referring to FIGURE 1, the teaching machine and system comprises a reproducing apparatus 11. The reproducing apparatus may, for example, comprise a magnetic tape reproducer having magnetic tape supply and take-up reels 12 and 13. The tape is driven past the transducer heads 14 by means of a capstan drive 16 associated with a pinch roller 17. It is, of course, apparent that a cartridge type magnetic tape apparatus may be employed. The audio information may be carried by other types of recording mediums, such as discs, from which the audio information may be recovered.

The front panel of the apparatus may be provided with controls 18. A speaker 19 may be enclosed in the apparatus housing or, if desired, one or more speakers may be separate for placement about the classroom.

As will be presently described, the machine employs a control system which is responsive to control signals which occur in time relationship with respect to the audio and visual portions of the lecture. In one embodiment of the invention, the control signals are recorded on the magnetic tape in a second track which runs parallel to the audio track. A magnetic transducer is associated with the second track.

The control system provides control pulses or signals to the associated equipment which, for example, may comprise a projector 21 for projecting visual information on a screen 20. The projector illustrated is a film type projector in which the film may be advanced frame by frame by electro-mechanical means such as a solenoid. In certain applications, the machine may be continuously operated for a predetermined period of time to deliver a moving picture. This might, for example, be useful in teaching production techniques to production workers who must follow a particular sequence in their work. Rather than a film projector, a slide projector may be employed to sequentially present slides in response to control signals. This system may also be used to sequentially present braille cards to blind people.

The control system is also connected to control the room lights 22 whereby when the projector is turned on, the room lights are turned off to place the room in darkness.

A plurality of students' desks 23 may be associated with the equipment and provide a strip of paper 24 for writing answers to questions. The students' desks may include buttons 25 which are operated to answer questions, as will be presently described. In certain instances, it may not be necessary to provide means for writing answers. The desks may then include only a housing 27 with a plurality of answering switches. The control network may be remotely controlled by an operator through a control box 28 which can be placed at the instructor's desk from which the instructor may control the operation of the lecture machine.

In accordance with the present invention, the control signals are reproduced from a control track where they have been recorded in the form of tone pulses. Referring to FIGURE 2, for example, the magnetic tape 10 may be associated with a first transducer head 14a which reproduces the audio signal. The audio signal is then amplified by an amplifier 31 and applied to the speaker 19. A second head is associated with a control track 33 and serves to reproduce the tone pulses. The tone pulses are amplified by an amplifier 34 and applied to a pair of filters 36 and 37. The filters 36 and 37 may be twin-T networks, each tuned to pass one of the tone pulse frequencies. By way of example, one of the tone pulses may have a frequency of 500 c.p.s., while the other may have a frequency of 1250 c.p.s.

By using twin-T filters which reject all frequencies but a narrow range of frequencies at and near the tone frequency, a simple frequency selective system is provided. There are four possible conditions: a 500 c.p.s. tone pulse present; a 1250 c.p.s. tone pulse present; no tone pulse present; and both tone pulses present. Each of these conditions serves to control operation of the teaching machine in a predetermined manner. The filters 36 and 37 apply their outputs to switching networks 38 and 39, respectively. The switching networks may, for example, include active elements, such as transistors or tubes, connected in a switching circuit.

A typical switching circuit is shown in FIGURE 5. The amplified signal from the amplifier 34 is applied to an emitter follower circuit 40 which includes transistor 41. The output of the emitter follower is applied to the twin-T filter circuits 36 and 37. The outputs of the filters 36 and 37 are applied to networks 42 and 43, respectively, which serve to apply a control signal to the base of the transistors 44 and 46, respectively. When the bias signal is applied to the base of the transistors, they conduct or switch to energize the associated relay coil K1 or K2. The relay coil K1 is energized when a 500 c.p.s. tone pulse is present on the control track. The relay coil K2 is energized when a 1250 c.p.s. tone pulse is present. Neither of the relays is energized when no tone pulses are present, and both relays are energized when both 500 and 1250 c.p.s. tone pulses are present.

The presence of a 500 c.p.s. pulse energizes the relay coil K1, FIGURE 2, and causes the relay contact 51 to connect the line 52 to the —V supply. This energizes the coil 53 of a stepping switch. Each time the coil 53 is energized, the wiper contact 54 is advanced one step. Thus, for each 500 c.p.s. tone pulse present on the control track, the relay K1 will be energized and the stepping switch 53 will advance one step. The wiper 54 is associated with the various contacts which are connected to control various operations of the teaching machine. The 500 c.p.s. tone pulses, therefore, serve to select the function of the machine and are referred to herein as function selection pulses.

The zero position of the wiper arm 54 is a neutral or start position. The first position is a timing position which energizes the capstan motor following a predetermined time delay. Thus, upon occurrence of a 500 c.p.s. pulse, the wiper 54 advances from the zero position to position 1. If, following the single 500 c.p.s. tone pulse, a 1250 c.p.s. tone pulse occurs, the relay coil K2 is energized. The 1250 c.p.s. pulses command the selected function and are herein referred to as command pulses. The relay contact 56 momentarily connects the wiper to the —V voltage supply to supply a command pulse which then is applied through the terminal 1 to the timing circuit designated generally by the reference numeral 57. The timing circuit includes a relay coil K5 having holding contact 58. Upon termination of the 1250 c.p.s. pulse, the relay coil remains energized through the lead 59 and contact 58. Connected in parallel with the coil K5 is the resistive element 61 of the timer 57. When the temperature of the resistive element has reached a predetermined value, the contact 62, which is normally closed, opens. The time interval may be fixed at any desired time, for example, 90 seconds.

When the relay is deenergized by opening the contact 62, the contact 58 applies the voltage —V to the timing capacitor 63 which is charged through the coil K6 of another relay. The current which flows to charge the capacitor energizes the coil and closes the contact 64. Closure of the contact 64 connects the voltage —V to the coil K8 of a relay associated with the capstan motor. When the coil K8 is energized, the contact 66 is closed to energize the capstan motor. The magnetic tape is driven past the transducer to reproduce recorded material. The contact 66a connects the coil to the —V voltage supply to maintain the coil K8 energized.

Referring to the circuit associated with the coil K8, it is observed that the capstan motor may also be started by depressing a start button 68 which energizes the coil K8 which is then locked in. The coil can be deenergized by depressing the stop button 69 which shorts out the relay coil K8. The resistor 67 is provided so that the coil may be safely short circuited. The start and stop push buttons 68 and 69 may be located on the front panel of the equipment. Push buttons may be connected in parallel therewith and operated from a remote location such as the control box 28. Thus, it is seen the capstan motor can be either manually or automatically started to reproduce recorded information. The capstan motor can be either manually or automatically stopped as will be described with respect to position 3 of the wiper 54.

The time interval can be started any time; for example, during a previous instruction. As a result, the capstan will stop at the end of the previous selection and go back on when the time interval has elapsed. Thus, any time interval shorter than 90 seconds can be programmed into the control track by starting the time interval prior to stopping of the tape. For time intervals longer than 90 seconds, a series of time intervals may be employed with the tape transport starting up for a short time for each time interval to deliver a control tone pulse.

Referring to FIGURE 2, there are shown four switches A, B, C and D for answering questions. These switches are located at the student's desk. Each set of switches is associated with a suitable electro-magnetic counter represented by coil 72, or other types of counters. On the audio track of the tape recorder the students are asked a question, to which there may be four possible answers, A, B, C or D. The question may also be presented visually on the projector screen. The students are asked to indicate, by closing one of the switches, which of the answers is correct. Meanwhile on the control track are reproduced a number of 500 c.p.s. function selector pulses to advance the stepping switch to a position corresponding to the correct answer, 4, 5, 6 or 7.

Assume the correct answer is D which is coupled to position 7 in FIGURE 2, then with stepping switch 54 disposed at the same position any student who closes switch D causes his counter to be connected to the relay contact 56 associated with the 1250 c.p.s. command pulses. When 1250 c.p.s. pulses are reproduced, the contact closes and connects the —V voltage supply to the counters which advance one count. If more than one 1250 c.p.s. pulse occurs, the counter is advanced a corresponding number of counts. Thus, the correct answers may be given any weight desired by pre-recording a corresponding number of 1250 c.p.s. command pulses. Students who close one of the other switches (wrong answer) cause an open circuit in the line supplying power to the associated counter.

Thus, in programming the machine, each question is weighted according to its importance and each student's performance is indicated by his total score on the associated counter.

It is noted that if the correct answer is C and switches A, B and C are closed, there is an open circuit between terminal 6 and the coil of the associated counter 72. If only switch C is closed, there is a completed circuit to terminal 6.

There is a second method by which the tape can be started. Assume that one or more of the students have closed switch D and that the stepping switch is moved to position 2. When a pulse is applied by means of closure of contact 56, the relay coil K4 is energized. The path of the current is through coil K4, diode 74, switch D and the counters to ground. The magnitude of the current is selected so that it is not sufficient to energize the counters. As long as any of the switches D are closed, the current continues to flow and the relay coil K4 remains energized. The students may be answering questions by writing the answer or calculating the answer while this action takes place. They may be instructed to close switch A when they are ready with the answer. As soon as the last student closes switch A, the current is interrupted and the relay coil is deenergized.

Circuitry similar to that described for the timer causes relay K6 to be energized and close momentarily. This causes the tape to restart. Operation of the circuit is briefly as follows: When the relay coil K4 is energized, the holding contact holds it energized until all the switches D are opened, at which time the coil is deenergized. Power is applied to the timing capacitor 76 which is charged through the relay coil K6. This closes the contact 64 to start the capstan motor as previously described. As the capacitor is charged, the contact 64 opens. The capstan motor continues to operate until it is stopped.

In operation, the students may be given a multiple choice question with alternatives A, B and C, and they may be instructed to close switch D until they are ready. As soon as all students open switch D, the relay K4 is deenergized charging the capacitor 76. The capstan motor starts.

Position 3 of the wiper arm 54 is connected to stop the capstan. With the wiper at position 3 and energization of the coil K2 by 1250 c.p.s. command pulses, the coil K8 is shorted.

Positions 4, 5, 6 and 7 have been previously described as related to students' answers.

Step 8 of the stepping switch energizes a relay K7 which applies power to the various students' desks to advance the paper as will be presently described. Step 9 may be connected to a warning device such as a buzzer to alert the instructor that the program is nearing its end. The 1250 c.p.s. tone pulse energizes the buzzer. The circuit may be used to perform other functions by replacing the buzzer with a relay. For example the loud speaker may be cut off so that verbal instructions may be interjected.

Position 10 is connected to a relay which controls the projector and room lights. Thus, by energizing the relay coil K9, contacts 81 of the relay are closed to turn on the room lights. When the relay is deenergized, the projector is on. The function of turning on and off of the projector and room lights may be performed by a push button 82.

Referring to FIGURE 3. there is shown a student's desk 23 including answering switches 25. The desk comprises a housing 86 having an upper hinged portion 87 which may be lifted for loading with a supply of paper 24.

The paper may be of the type which includes double sheets or strips, one of which may have one side impregnated with a transfer material so that a copy can be obtained on the other. The double strips or sheets may be provided with carbon paper between the same.

The paper may be on a supply roll 88. The paper is then threaded over a writing plate 89 and past a driven roller 91 which cooperates with pinch rollers 92 carried by the housing portion 86. An idler roller 93 is provided for separating the paper to direct the copy to the take up roller 94 and the original through the slit 85. The paper may be illuminated by a light source disposed in housing 96. The driven roller is driven from a motor 97. A friction belt may extend between pulley 98 carried by the driven roller and the pulley 99 carried by the take-up roller 94 to provide suitable take-up tension.

The student writes an answer on the portion of the upper sheet exposed through the window 101. The command signal advances the paper. The copy is retained as a permanent record and the original is available to the student.

The importance of this type of desk is that the student may be asked to write an answer at the appropriate moment and the machine can be programmed to advance the paper so that the student cannot make alterations to the carbon copy. In this way, the machine provides for questions requiring constructed answers to be asked and removes the limitation of only multiple choice questions. It discourages cheating by the students.

The relay coils K1 and K2 may be connected to switches (not shown) in parallel with the switching transistors 44 and 46 so that by closing the appropriate switch, the wiper is advanced for command pulses to be applied to the associated circuits. This permits remote operation of the machine or resetting the machine in the event of tape breakage or the like.

The machine may be reset by depressing the reset button 121 or automatically by energizing both of the coils K1 and K2 simultaneously.

The stepping switch includes interrupter contacts 122, 123, 124 and 125 which are activated when the stepping switch is energized. For manual stepping, the switch 121 is closed. This applies power through the closed interrupter contacts 123 and 124 to the stepping switch coil 53. As the switch steps, the interrupter contacts open and then close to provide another current pulse to the coil 53 for another step. Thus, as long as the switch 121 is closed, the stepping switch will step. When it reaches the home position "0," the interrupter contact 125 closes and the indicating light 127 lights up.

For automatic operation, both coils K1 and 22 are energized. The interrupter contact 122 changes position to apply power to the relay coil K10 which has a capacitor 128 connected across it. The time constant of this circuit can be selected so that the relay contact 129 is closed to apply current through the interrupter contacts 123 and 124 to the coil 53 for a time sufficiently long to step the switch to the home position.

The contacts 123 and 124 may be arranged whereby they open at the home position to assure resetting to the home position during manual or automatic operation.

To illustrate the operation of the machine, its use to deliver a lecture on basic algebra is described. Assuming that a slide projector is employed, slide 1 may present as the visual display the words "BASIC ALGEBRA" as shown in the upper portion of FIGURE 4A. The projector is turned on by depressing the button 82 which at the same time turns off the room light; the start button is depressed which energizes the capstan motor. The audio program is reproduced and may state: "This is a talk on the use of symbols in algebra."

The information coming off the control track is illustrated in the lower part of FIGURE 4. During the delivery of the audio material, no control pulses are reproduced. At the end of the audio material, a 1250 c.p.s. pulse 141 is indicated. This pulse will be applied to the projector to advance the same to slide 2, illustrated in FIGURE 4B, "$p$ times $q$ equals $pq$." Simultaneously, the audio program may be: "If we have two unknowns, $p$ and $q$, and if we multiply them together, the result is written as the two symbols combined, that is to say $pq$."

At the end of the audio material, a 1250 c.p.s. command pulse 142 is reproduced. This brings up the next slide which presents the question: "Does it matter whether you write $pq$ or $qp$?" The audio may continue with the same question: "Does it matter whether you write $pq$ or $qp$? Answer by depressing the appropriate pushbutton." During the time the audio is presented, 500 c.p.s. function pulses 143 are generated to step the switch arm 54 to the correct answer line B, position 5. After a delay which gives the student time to depress the button, 1250 c.p.s. control pulses 144 are generated. For example, if the correct answer is to be given a weight of 6, six such pulses are generated. These serve to add a count of six to the counter.

Six 500 c.p.s. pulses 146 bring the contact arm to the zero position and a subsequent 1250 c.p.s. function pulse 147 will bring on slide 4, FIGURE 4D, showing the correct answer is B, and at the same time the audio program is delivered stating: "Did you have the correct answer?" It's B: $p$ times $q$ is the same as $q$ times $p$ so that $pq$ must equal $qp$."

Rather than generating six 500 c.p.s. function pulses to reset the machine, 500 c.p.s. and 1250 c.p.s. pulses can be generated simultaneously as described above.

By using the circuit, which has been described in connection with the buzzer, to operate a rotary stepping switch 151, FIGURE 6, the machine can be used so that one set of pushbuttons 152 operates a different counter, represented by coils 1–10, for each position of the stepping switch. The machine can be used with only one student, and his score can be shown in a selective manner on the counters. Each counter might represent a different branch of the subject. Similarly, two desks with five counters each could be used, or any similar arrangement to give a more elaborate scoring system.

To further explain, stepping switch 54 can be advanced by function selection pulses to position No. 9, i.e., the buzzer line. With the coil of the buzzer line coupled to operate stepping switch 151, the subsequent sensing of command pulses will step switch 151 to select any one of ten counters, represented by the ten numbered coils in FIGURE 6. These counters can each represent a separate category or subject, e.g., geography, mathematics, etc. Then, by disposing the armature of stepping switch 54 to the "correct" answer line, either (4), (5), (6) or (7), operation of pushbuttons 152 will control the particular counter corresponding to the category selected by switch 151. If the button selection is correctly made, the selected counter will register upon receipt of the next command pulse over "answer" lines (4)–(7). The foregoing procedure will, therefore, serve to record the performance of a single student being examined in several categories.

Under certain circumstances it may not always be desirable to employ a pre-recorded program which entails the use of the foregoing recorded function and command pulses. For example, it may be desirable for the instructor to take over the quizzing function so that he can personally vary the program.

Accordingly, a composite system is shown in FIGURE 7 which is compatible with and adapted to be operated either from the previously described automatic system via lines (4), (5), (6), (7), or, when desired, can be taken over manually by the instructor.

The general system organization for the lecture system arrangement shown in FIGURE 7 for quizzing students includes a number of student response input stations 160. Each student station includes means for entering one of four possible responses whereby each student can make his own selection. An OFF position is provided for cutting non-participating stations out of the system. The response entry means, accordingly, is capable of providing mutually exclusive discrete stable states representing four possible responses, such as the stable states of each station as provided via the four input lines 162, 163, 164, 166. Means are also provided at each station for selectively establishing one of the stable states of the entry means, such as by the wipers 161.

One answer must be designated as the proper answer to each question. Accordingly, means are provided for "designating" a predetermined one of the stable states, (represented by lines 162, 163, 164 and 166) as the proper answer. An instructor's manual control station 167 includes a selector switch 168 adapted to make contact with the ABCD interrogation lines, respectively 171 through 174. Means for indicating correct responses entered at each student station includes a student response register unit 176, associated with each of the student stations 160 so as to manifest correct responses made by the student.

After each student has made his selection, means are provided, operating through selector 168, to transmit a pulse signal simultaneously to each of those registry units 176, associated with a wiper 161 then in a position corresponding to the position of selector 168. The means for pulsing the selector interrogation lines 171–174 serves to selectively form identifiably different pulse signals corresponding to different weights to be accorded a correct response. If the question is to be accorded a double weight, two pulses will form the pulse signal applied to the interrogation line. If the weight is to be trebled, then three pulses will be applied, and so on. As shown in FIGURE 7 a circuit interruptor 177 is activated by a manual telephone dial device 178 whereby various numbers of pulses can be applied to make up the particular pulse signal to be fed to the interrogation lines.

Each register unit 176 includes a counter 179, and a bi-stable lamp lighting section 181. Each lamp lighting section 181 includes a bi-stable switch means, such as the flip-flop 182 and a lamp 183. Assuming, that a student has selected the correct response so as to have established that one of the stable states of the response entry means corresponding to the interrogation line 171–174 which has been established by the instructor as the proper response, a pulse applied by dial 178 to any one of the four interrogation lines will serve to initially reset the bi-stable flip-flop switch 182 to extinguish its associated lamp 183. Thereafter, the pulse will be transmitted via wiper 161 to set switch 182 thereby lighting its associated lamp 183.

In order to permit the same pulse which is applied for resetting the switch 182 to later set the switch 182 a trigger signal generator 184 is made responsive to the leading edge of the applied pulse 186 so that it is the leading edge of pulse 186 which initiates reset of the bi-stable switch means 182. In this manner suitable delay is introduced into the "set" line 187 to give lamp 183 a chance to be extinguished. Trigger signal generator 184 includes suitable means, such as a differentiator driving a Schmitt trigger, for example.

The system of FIGURE 7 further includes means for sensing the selected state of each of the student stations and is arranged to provide a read-out of the proportion of all of the stations which is in each of the states thereof. For example, the system will provide a reading as to the percentage of all students answering A, as well as the percentages of all students answering B, C, D, respectively.

In general, the means for providing this direct readout of the percentage of students entering each of the possible responses includes a constant current source 188 and a plurality of meters coupled in parallel to the constant current output line of the source. The predetermined constant current from the source 188 provides that amount of current required to provide full scale deflection of any one of the meters. Accordingly, as the current divides through the four parallel meters, indication will be given directly, in percentage, of each possible response which has been entered by the students.

It will also be noted that the student stations each include an OFF position 189 whereby whenever the student stations exceed the number of students participating, those stations not in use can be switched off. Thus, the meter readings will be unaffected by changing the number of participating student stations in view of the manner in which the system is arranged.

It should also be clear that by first advising all the students to dispose their wipers 161 at a given one of the station's contact points 191, for example, at the A position, the A meter 192 will directly register the progressively diminishing percentage of students yet to make his selection. After the percentage of students who have not made a selection drops below a predetermined level, the instructor can provide a suitable warning to the class and then enter a score by applying one or more pulses 186 by dial 178.

At the same time meters 193, 194, 195 serve to read out the percentage of students making each of the several responses and if enough erroneous answers are entered the instructor is immediately aware of the weak areas of instruction.

The read-out circuit shown in FIGURE 7 further includes remote meters 196, 197, 198 and 199 which reflect the condition of meters 192 through 195. A voltage source 201 serves to permit the remote meters to be disposed a considerable distance away, as will be described further below, for purposes such as found in conducting instruction in a number of classrooms from a remote television studio.

Finally, it will be observed in the general arrangement of FIGURE 7 that the pulsing of interrogation lines 171 through 174 can also be accomplished by the application of one or more of the pre-recorded command pulses as applied via lines (4), (5), (6), (7) previously described. Thus, it is clear that the composite system shown in FIGURE 7 can be automatically activated from a pre-recorded program as well as manually by the instructor.

FIGURES 8A and 8B, when taken together, show the particular circuit details for an operating circuit corresponding substantially to the system schematically shown in FIGURE 7. Certain of the units shown only as boxes in FIGURE 7 have been outlined by dashed lines in FIGURES 8A and 8B for easy recognition thereof. The general description outlined above and the particular circuit details shown in FIGURES 8A and 8B will make it clear as to the construction and operation of a system according to the invention. However, the following remarks are provided for further explanation of certain of the components herein.

The current regulator 188 includes a semi-adjustable sampling resistance 202, the voltage across which is compared with a 24 volt Zener diode 203. The resulting difference is fed as a control current to a power transistor 204 whose emitter current will be maintained at a predetermined value, for example, 50 milliamperes, notwithstanding variations of the load on the emitter circuit.

If, as shown, there are four student stations, three of them responding answer "B" and one responding answer "A," then the four 220 ohm load impedances 206 as provided, for example, by the coils of counters 179, provide a 55 ohm impedance to the 50 ma. current supplied via emitter 207. The voltage between emitter and ground then is 2.75 volts, while the voltage across the sampling resistor 202 is 24 volts. This leaves 1.25 volts across the power transistor 204, thereby accounting for the 28 volts supplied to the circuit.

The 50 ma. controlled current divides among the ABCD lines in accordance with the number of students selecting each of the possible responses. As shown, with student station No. 2 positioned to provide the A response and the other three student stations poistioned to provide the B response, 25% of the current will flow in line A and 75% in the B line. Each of the meters 192–195 are calibrated linearly to read 100% at full scale deflection. Accordingly, the lecturer reads off the percentage directly of those students answering with each of the several possible responses.

When certain of the student stations are not to be used, the wipers 161 for those particular stations can be moved to an OFF position. It will be noted, however, that while the unused stations are cut out of the system, the percentage readings for meters 192 through 195 will be unaffected.

Remote meters 196 through 199 are arranged in a common base connection with transistor amplifiers 208, 209, 210 and 211 so as to give a comparable reading at the remote and local stations respectively. A switch 212 keeps the remote meters at zero until the instructor releases them. Each meter 196–199 is series connected to a variable impedance such as the resistors 213.

Impedances 213 can be supplied by the loop resistance of telephone lines separating the remote monitor from the local monitor. Thus, where a TV studio is employed for telecasting a lecture from the remote monitor position, a loop resistance of 1200 ohms can be developed by a 15 mile radius separating the classrooms from the studio.

Another embodiment of the system shown in FIGURES 8A and 8B is provided by the arrangement shown in FIGURE 10 wherein three classrooms 216, 217 and 218 are shown. It is to be understood that each of classrooms 216–218 includes a lecture system as disclosed in FIGURES 7 and 8. The remote monitor meters provide a direct read-out to the television lecturer of the percentage performance among students of a selected classroom, or an average of the percentage performances of several classrooms.

The remote meters are capable of indicating the foregoing readings depending upon the condition of switches 221, 222, or 223. Each of the foregoing three switches serves to couple and decouple their respective local meter readings into the circuit of the remote meters.

By using a 15 volt power source common for all classrooms, the common-base transistor amplifiers 208 through 211 of FIGURE 8A draw a total of 50 ma. for each classroom. In the circuit of FIGURE 10, for example, a single meter 219 senses the total current to the "A" lines via the remote meters connection to all three classrooms, assuming switches 221–223 to be closed.

Each of the remote meters is in parallel with a number of shunt lines 225 equal in number to the number of classrooms. Each impedance line includes a shunt switch 220. Switches 220 are coupled to cut the shunt lines in and out of the parallel circuit following the condition of switches 221–223. Thus, as switch 221 is opened to disconnect classroom 216, one shunt line 225 will be opened for each remote meter, allowing each meter to deflect full-scale at 100 ma. instead of 150 ma., that is to say, at 50 ma. for each classroom in the circuit. The switches 221, 222 and 223 serve to connect any desired classroom or combination of classrooms to the remote metering circuit. The meters accordingly need no adjustment, since full scale deflection always occurs when 100% of the students respond with the same answer. The meters can therefore show the average of the participating classrooms, which is not the same as the average of the participating students if it is assumed that there is a different number of participating students in each classroom.

No readjustment of the meters is necessary, even if students come and go in the two classrooms since the meters of each classroom are set to automatically divide the controlled 50 ma. current as described previously.

By being able to selectively obtain a direct readout of the average performance of the several classrooms as well as of each individual classroom, it is possible for a television lecturer to gain an indication as to which classroom is performing the best and which classroom may need additional instruction.

Another embodiment of the system described with reference to FIGURES 8A and 8B has been shown in FIGURE 9 as now to be described. By replacing the remote meters 196–199 with a single meter 224 drawing a current, for example, on the order of from 0–1 milliamp, a readout can be provided identifying and recording the percentage of students who selected the most popular response. The voltage representing such response will forward-bias its associated one of the diodes 226 and produce a meter deflection related to the percentage of students answering with that particular response. If it is assumed that the responses which are registered are equally distributed among the four possible selections, the lowest maximum response will be registered at 25%. In order to expand the relatively small scale of the meter 224, a three volt Zener diode 227 is series connected to the meter 224.

For purposes of analyzing the quality of questions asked, means for permanently recording the indicated percentages read by meter 224 have been provided, as schematically shown in the form of the strip chart recorder 228. A stylus 229 is arranged to be driven by the deflections of meter 224. A pressure sensitive paper can be used and the paper fed continuously so as to provide a suitable time base. Suitable strip chart recorders of this type are of course commercially available. Accordingly, further description thereof is believed unnecessary.

Diodes 226 are preferably germanium rather than silicon in order to minimize non-linearity due to the knee of the diode curve.

The reset trigger pulse generator 184 and one of the flip-flops 182, as previously mentioned, control the action of the indicating lamp 183 as included in each of the respective indicating sections 181. In FIGURES 8A and 8B it is clear that when a counting pulse arrives on one of the interrogation lines, such as line A, it causes the transistor 231 to conduct. A differentiating circuit, including impedances 232, 233 and condenser 234, is diode coupled to receive the pulse 186 and provide a sharply peaked trigger pulse 236. Pulse 236 is amplified by the second transistor 237 so as to develop sufficient power to switch the state of a number of flip-flops to which it may be coupled. Accordingly, a correspondingly spiked pulse 238 appears on the output line 239 so as to reset all flip-flops 182.

One flip-flop is shown for illustrating the connections to be made for operating its associated counter. The negative-going reset pulse on output line 239 passes via diode 241 and pulls transistor 242 out of conduction. Accordingly, if lamp 183, which forms its collector load was previously lighted it will be extinguished at the leading edge of counting pulse 186.

Since the reset trigger generator provides a pulse whenever a counting pulse appears on any of the lines ABC or D, all flip-flops will be reset by the leading edge of any such counting pulse. The lamp 183 will then be lighted in response to the same pulse 186 appearing on the "set" line 243. The trailing edge of the wave form for pulse 186 is positive-going and passes through diode 244 to turn transistor 242 "on". Where the student answers incorrectly by positioning his wiper 161 to the incorrect contact point 191, the associated flip-flop 182 will remain in its reset condition whereby the lamp 183 will not be lighted.

From the foregoing it will be readily apparent that a highly versatile system for automatically or manually quizzing a class of students and for analyzing their performance as well as the performance of the instructors associated with each of several classrooms of students has been provided. A direct read-out in percentage of students providing each of the possible responses is available to a supervisor located at either a local station or at a remote position such as a television studio. If the assumption is made that the majority of students will provide the right answer to any given question, a question analyzing apparatus is disclosed whereby the percentage of students providing the correct answer for each of the questions propounded can be readily obtained.

Questions propounded can be weighted in the scoring of points simply by introducing a plurality of pulses to constitute a pulse signal for driving a counter. Thus, in various ways the responses of the students participating can be registered either by giving merely a visual indication through means of a lamp or counter or, when neither a lamp nor a counter is employed, by taking a reading of the performance of the class as a whole.

I claim:

1. In a lecture system of the type described having a record medium prepared with prerecorded instructional material and control signals thereon, means for reproducing said prerecorded instructional material and said control signals, said control signals comprising pulses for selecting functions to be performed and command pulses for timely activating the selected function, a plurality of predetermined circuits, each serving to perform a related and different function, means responsive to said function selection pulses to selectively establish one of said predetermined circuits, means responsive to said command pulses to activate said one of said predetermined circuits thereby timely performing the function related thereto, a plurality of student stations, registering means at said stations for registering answers to questions, said predetermined circuits including circuit means coupled to said stations and responsive to said pre-recorded command pulses to activate said registering means.

2. A lecture system as defined in claim 1 wherein said registering means comprises means at said stations manually settable by the student to represent answers to questions, and wherein said predetermined circuits include interrogating circuit means coupled to said manually settable means and arranged to sense the condition of same to detect correct answers, and scoring means responsive to said iterrogating circuit means to store a total score representing correct answers from said stations.

3. A lecture system as defined in claim 2 further including means operatively coupled to said scoring means for selectively weighting the answers entered into said scoring means.

4. In a lecture system of the type described having a record medium prepared with pre-recorded instructional material and control signals thereon, means for reproducing said prerecorded instructional material and said control signals, said control signals comprising pulses for selecting functions to be performed and command pulses for activating the selected function, a plurality of predetermined circuits, each serving to perform a related function, a stepping switch responsive to said function selection pulses to selectively establish one of said predetermined circuits, and means responsive to said command pulses to activate said one of said predetermined circuits thereby performing the function related thereto, and means responsive to the conjoint receipt of both said command and function selection pulses and operably coupled to said stepping switch to reset same.

5. In a lecture system of the type described having a record medium prepared with prerecorded instructional material and control signals thereon, means for reproducing said prerecorded instructional material and said control signals, said control signals comprising pulses for selecting functions to be performed and command pulses for timely activating the selected function, a plurality of predetermined circuits, each serving to perform a related and different function, means responsive to said function selection pulses to selectively establish one of said predetermined circuits, means responsive to said command pulses to activate said one of said predetermined circuits thereby timely performing the function related thereto, a plurality of student stations, registering means at said stations for registering answers to questions, said registering means including a strip of material for receiving written impressions and electro-mechanical means serving to advance same, said predetermined circuits including circuit means coupled to said electromechanical means at said stations and responsive to said prerecorded command pulses to advance said strip at said stations.

6. In a lecture system of the type described having a record medium prepared with prerecorded instructional material and control signals thereon, means for reproducing said prerecorded instructional material and said control signals, said control signals comprising pulses for selecting functions to be performed and command pulses for timely activating the selected function, a plurality of predetermined circuits, each serving to perform a related and different function, means responsive to said function selection pulses to selectively establish one of said predetermined circuits, means responsive to said command pulses to activate said one of said predetermined circuits thereby timely performing the function related thereto, a plurality of student stations, response entry means at said stations for selecting answers to question, said predetermined circuits including circuit means coupled to said stations and responsive to said pre-recorded command pulses to interrogate said response entry means.

7. In a lecture system of the type described having a record medium prepared with prerecorded instructional material and control signals thereon, means for reproducing said prerecorded instructional material and said control signals, said control signals comprising pulses for selecting functions to be performed and command pulses for timely activating the selected function, a plurality of predetermined circuits, each serving to perform a related and different function, means responsive to said function selection pulses to selectively establish one of said predetermined circuits, means responsive to said command pulses to activate said one of said predetermined circuits thereby timely performing the function related thereto, a plurality of student stations, response entry means at said stations for selecting answers to question, a plurality of counter operably associated with each station, each counter being adapted to store the student's score in a selected category of subject matter, said predetermined circuits including a category selection circuit means operatively coupled to receive command pulses applied thereto, switch means operatively coupled to said category selection circuit means for selectively coupling the response entry means of each station to a given one of the plurality of counters associated therewith, said switch means being responsive to said command pulses received via said category selection circuit to select said given counter, another of said predetermined circuits including circuit means coupled to said stations and responsive to said pre-recorded command pulses to interrogate said response entry means to record each student's score in said given counter whereby scores by category of subject matter can be indicated.

8. Lecture apparatus for quizzing students comprising a plurality of student response input stations, each station including response entry means providing a plurality of discrete stable states thereof, each state of said entry means being adapted to represent one of a plurality of possible student responses, means operatively coupled to and respectively associated with the entry means of each said station to register correct responses therefrom, means for establishing a predetermined one of said states as representative of a correct response, and pulsing means operatively coupled via the last named means to transmit a pulse signal simultaneously to each of those register means associated with an entry means then in said predetermined one of said states, said pulsing means including means to selectively form identifiably different pulse signals to be transmitted to said register means corresponding to different weights to be accorded a correct response.

9. A lecture apparatus for quizzing students comprising a plurality of student response input stations, response entry means at said stations, each said entry means including a plurality of discrete contact points and input means settable to one of said points to manifest one of a plurality of possible student responses, a plurality of interrogation lines one of which represents a correct response, each of said plurality of lines being operatively coupled respectively to all of those contact points of said stations representing different given ones of said possible student responses, means for applying a predetermined number of pulses, corresponding to the weight to be accorded a correct response, to that one of said lines which represents a correct response, and a plurality of storage registers each respectively operatively coupled via an associated one of said response entry means to be responsive to pulses on said one of said lines to register a score when the input means is set in association with that contact point then coupled to said one of said interrogation lines, thereby manifesting a correct student response.

10. In lecture apparatus for quizzing students, apparatus comprising a plurality of student response input stations, each station including response entry means providing a plurality of discrete stable states thereof, each state of said entry means being adapted to represent one of a plurality of possible student responses, and one state of said entry means serving to represent non-entry of any response, means operatively coupled to each said entry means for reading out the progressively diminishing proportion of all said response input stations having an entry means remaining in said one state subsequent to commencement of student entry of responses, correct response indicating means for each said entry means and operatively responsive thereto, means for simultaneously applying a signal to each of those indicating means having an associated entry means then in a predetermined one of said stable states whereby said predetermined state represents the proper response, the last said means being adapted to apply said signal after said proportion has diminished to a predetermined level.

11. Apparatus according to claim 10 wherein the readout means serves to sense the selected state of each said entry means and reads out respectively that proportion of the total number of stations having entry means in each of the states thereof.

12. Lecture apparatus for quizzing students comprising a plurality of student response input stations, each station including response entry means providing a plurality of discrete stable states thereof, each state being adapted to represent one of a plurality of possible student responses, means for selectively reducing the number of those entry means participating in a question, read out means operatively coupled to each said entry means for sensing the selected state thereof and for reading out respectively that percentage of the total number of participating stations having entry means in each of the states thereof, means connected to said read out means and responsive to changes in the number of participating entry means to condition said read out means to read out that percentage of the changed number of participating stations having entry means in each of the states thereof, correct response indicating means for each said entry means and operatively responsive thereto, and means for applying a signal to each of said indicating means via a predetermined one of said stable states of the entry means associated therewith whereby said predetermined state represents the correct response.

References Cited
UNITED STATES PATENTS

| | | | |
|---|---|---|---|
| 2,870,548 | 1/1959 | Chedister | 35—11 |
| 3,190,014 | 6/1965 | Rhodes | 35—9 |
| 3,269,033 | 8/1966 | Reolfield | 35—48 |
| 3,300,876 | 1/1967 | Johannsen | 35—9 |

EUGENE R. CAPOZIO, *Primary Examiner.*

W. W. NIELSEN, *Assistant Examiner.*

UNITED STATES PATENT OFFICE
CERTIFICATE OF CORRECTION

Patent No. 3,416,242

December 17, 1968

Thomas R. Nisbet

It is certified that error appears in the above identified patent and that said Letters Patent are hereby corrected as shown below:

In the heading to the printed specification, lines 4 and 5, "Edex Corporation, Mountain View, Calif.," should read -- Raytheon Education Company, --.

Signed and sealed this 17th day of March 1970.

(SEAL)
Attest:

Edward M. Fletcher, Jr.
Attesting Officer

WILLIAM E. SCHUYLER, JR.
Commissioner of Patents